(12) United States Patent
Bruguera

(10) Patent No.: US 11,500,612 B2
(45) Date of Patent: Nov. 15, 2022

(54) METHOD, SYSTEM AND DEVICE FOR MULTI-CYCLE DIVISION OPERATION

(71) Applicant: Arm Limited, Cambridge (GB)

(72) Inventor: Javier Diaz Bruguera, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/791,272

(22) Filed: Feb. 14, 2020

(65) Prior Publication Data

US 2021/0255831 A1     Aug. 19, 2021

(51) Int. Cl.
| | | |
|---|---|---|
| *G06F 7/535* | (2006.01) | |
| *G06F 9/30* | (2018.01) | |
| *G06F 7/57* | (2006.01) | |
| *G06F 7/72* | (2006.01) | |

(52) U.S. Cl.
CPC .............. *G06F 7/535* (2013.01); *G06F 7/57* (2013.01); *G06F 7/721* (2013.01); *G06F 9/3001* (2013.01)

(58) Field of Classification Search
CPC ........ G06F 7/535; G06F 7/537; G06F 7/5375; G06F 7/4873; G06F 7/4917; G06F 7/721; G06F 7/57; G06F 9/3001
See application file for complete search history.

(56) References Cited

U.S. PATENT DOCUMENTS

| | | | | |
|---|---|---|---|---|
| 5,023,827 A * | 6/1991 | Kehl | ...................... | G06F 7/535 708/542 |
| 5,132,925 A * | 7/1992 | Kehl | ...................... | G06F 7/535 708/542 |
| 5,249,149 A * | 9/1993 | Cocanougher | .......... | G06F 7/535 708/504 |
| 5,696,712 A * | 12/1997 | Prabhu | .................. | G06F 7/5525 708/650 |
| 5,910,910 A * | 6/1999 | Steele, Jr. | ............... | G06F 7/535 708/650 |
| 6,549,926 B1 * | 4/2003 | Kalambur | ............. | G06F 7/5375 708/650 |
| 6,625,633 B1 * | 9/2003 | Hirairi | .................... | G06F 7/535 708/650 |
| 7,016,930 B2 * | 3/2006 | Hinds | ................... | G06F 7/5375 708/605 |
| 9,785,407 B2 * | 10/2017 | Burgess | ................ | G06F 9/3001 |
| 10,216,481 B2 * | 2/2019 | Bruguera | .............. | G06F 7/4917 |
| 10,353,671 B2 * | 7/2019 | Bruguera | ................ | G06F 7/487 |
| 2001/0025293 A1 * | 9/2001 | Inui | ......................... | G06F 7/535 708/650 |

(Continued)

OTHER PUBLICATIONS

A. Nannarelli, "Radix-16 Combined Division and Square Root Unit," 2011 IEEE 20th Symposium on Computer Arithmetic, 2011, pp. 169-176, doi: 10.1109/ARITH.2011.30. (Year: 2011).*

(Continued)

*Primary Examiner* — Emily E Larocque
*Assistant Examiner* — Carlo Waje
(74) *Attorney, Agent, or Firm* — Berkeley Law & Technology Group, LLP

(57) ABSTRACT

The present disclosure relates generally to arithmetic units of processors, and may relate more particularly to multi-cycle division operations. Multiple-cycles of a radix-m division operation may be performed to generate one or more signal states representative of a result value based at least in part on a dividend value and a divisor value.

20 Claims, 8 Drawing Sheets

(56) References Cited

U.S. PATENT DOCUMENTS

| | | | |
|---|---|---|---|
| 2004/0083255 A1* | 4/2004 | Hinds | G06F 7/5375 708/650 |
| 2017/0199723 A1* | 7/2017 | Bruguera | G06F 7/537 |
| 2018/0203669 A1* | 7/2018 | Bruguera | G06F 7/535 |

OTHER PUBLICATIONS

G. Cornetta and J. Cortadella, "A radix-16 SRT division unit with speculation of the quotient digits," Proceedings Ninth Great Lakes Symposium on VLSI, 1999, pp. 74-77, doi: 10.1109/GLSV.1999. 757380. (Year: 1999).*

J. D. Bruguera, "Radix-64 Floating-Point Divider," 2018 IEEE 25th Symposium on Computer Arithmetic (ARITH), 2018, pp. 84-91, doi: 10.1109/ARITH.2018.8464815. (Year: 2018).*

Ercegovac and Lang "Digital Arithmetic Ch. 5 Division by Digit Recurrence" Lecture Notes. Retrieved on [Jun. 3, 2021], Retrieved from the Internet <https://www.just.edu.jo/~tawalbeh/cpe779/slides/ch5.pdf> (Year: 2003).*

Oberman et al. "An Analysis of Division Algorithms and Implementations". Retrieved on [Jun. 3, 2021], Retrieved from the Internet <http://i.stanford.edu/pub/cstr/reports/csl/tr/95/675/CSL-TR-95-675.pdf> (Year: 1995).*

J. D. Bruguera, "Low Latency Floating-Point Division and Square Root Unit," in IEEE Transactions on Computers, vol. 69, No. 2, pp. 274-287, Feb. 1, 2020, doi: 10.1109/TC.2019.2947899. (Year: 2020).*

S. F. Oberman and M. J. Flynn, "Minimizing the complexity of SRT tables," in IEEE Transactions on Very Large Scale Integration (VLSI) Systems, vol. 6, No. 1, pp. 141-149, Mar. 1998, doi: 10.1109/92.661256. (Year: 1998).*

J. Fandrianto, "Algorithm for high speed shared radix 4 division and radix 4 square-root," 1987 IEEE 8th Symposium on Computer Arithmetic (ARITH), 1987, pp. 73-79, doi: 10.1109/ARITH.1987. 6158696. (Year: 1987).*

* cited by examiner

METHOD, SYSTEM AND DEVICE FOR MULTI-CYCLE DIVISION OPERATION

BACKGROUND

Field

The present disclosure relates generally to arithmetic units of processors, and may relate more particularly to multi-cycle division operations.

Information

Integrated circuit devices, such as processor, for example, may be found in a wide range of electronic device types. For example, one or more processors may be used in mobile devices, such as cellular phones, for example, as well as in computers, digital cameras, tablet devices, personal digital assistants, wearable devices, etc. Mobile devices and/or other computing devices, for example, may communicate with other mobile devices and/or computing devices via a communication channel and/or a communication path, such as comprising a portion of the Internet and/or the Web one or more networks, such as the Internet, for example. A mobile device, for example, may include integrated circuit devices, such as processors, to facilitate communication with other mobile devices and/or computing devices.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
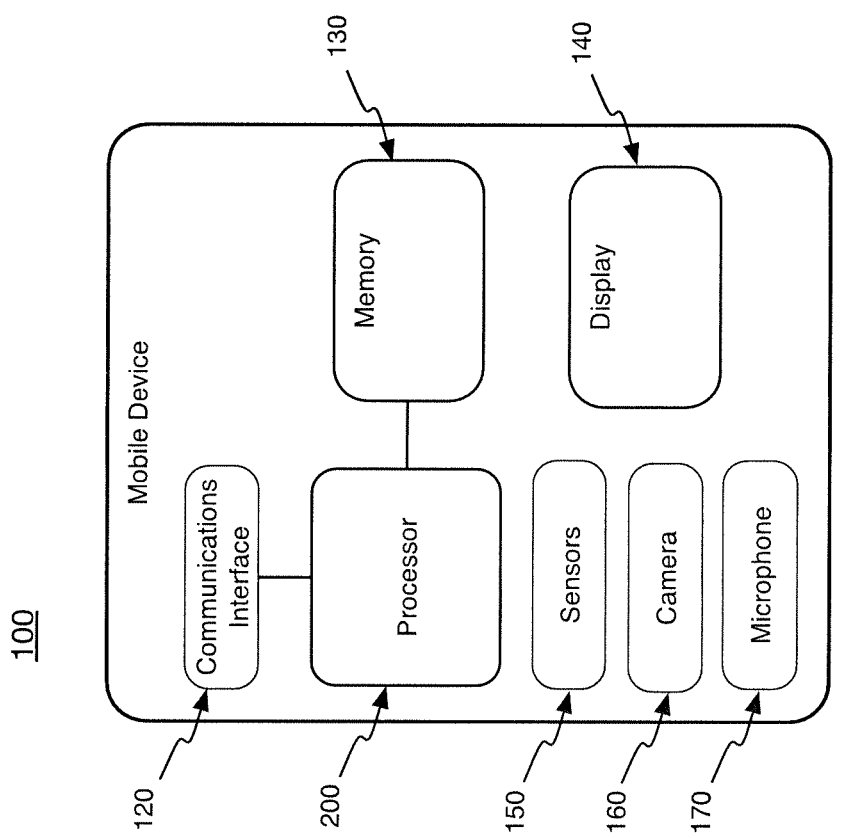
FIG. 1 is a schematic diagram illustrating an example mobile device, in accordance with an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned above, integrated circuit devices, such as a processor, for example, may be found in a wide range of electronic device types. For example, one or more processors may be used in mobile devices, such as cellular phones, for example, as well as in computers, digital cameras, tablet devices, personal digital assistants, wearable devices, etc. Mobile devices and/or other computing devices, for example, may communicate with other mobile devices and/or or computing devices via a communication channel and/or a communication path, such as comprising a portion of the Internet and/or the Web one or more networks, such as the Internet, for example. A mobile device, for example, may include integrated circuit devices, such as processors, to facilitate communication with other mobile devices and/or computing devices. In some circumstances, processors, for example, may include circuitry to perform division operations (e.g., calculating a quotient result value given dividend and divisor values as inputs). In some circumstances, division operations may be relatively time consuming and/or relatively resource consuming (e.g., relatively inefficient utilization of processing resources and/or memory resources). Further, in some circumstances, circuitry to perform division operations may make relatively inefficient use of integrated circuit die area. Example embodiments described herein, including various example implementations, may be directed at improving efficiency of division operations in terms of time consumed, semiconductor area utilized and/or resources consumed, for example.

In an implementation, as described more fully below, processors and/or other integrated circuit types may incorporate circuitry to perform multi-cycle division operations that may include obtaining one or more signals and/or states representative of a dividend value and one or more signal states representative of a divisor value. In an implementation, multiple cycles of a radix-m division operation may be performed to generate one or more signals and/or states representative of a result value (e.g., quotient result value) based at least in part on a dividend value and/or divisor value, wherein performing an individual cycle of the multiple-cycles of the radix-m division operation may include performing first and second radix-n iterations to generate first and second radix-n quotient values, wherein n is a square root of m.

Further, as discussed more fully below, in an implementation, division operations may comprise digit-recurrence-type division operations. "Digit-recurrence division" and/or the like refers to an iterative divisional approach wherein for individual iterations a radix-r quotient value (e.g., $q_{i+1}$) may be computed as well as a remainder value (e.g., rem[i+1]). In an implementation, a higher-radix digit-recurrence operation may include multiple lower-radix iterations per individual cycle. For example, a radix-64 division operation may include two radix-8 iterations per cycle. In an implementation, a radix-64 division operation may generate a six bit quotient value per iteration, and a radix-8 division operation may generate a three bit quotient value per iteration. Therefore, in an implementation, two radix-8 iterations may be utilized to perform a radix-64 iteration to generate a six bit quotient value per cycle.

As explained more fully below, individual iterations may include calculation of a radix-n quotient value (e.g., quotient "digit") and/or update of a remainder value, in an implementation. Further, in an implementation, calculation of a radix-n quotient value for a particular iteration may include determining an estimated remainder value and/or comparing the estimated remainder value with a set of selection values (e.g. selection constants). Additionally, in an implementation, estimated remainder values for individual iterations may be updated based at least in part on a remainder value, a divisor value, and/or radix-n quotient values for the individual iterations.

In an implementation, to improve efficiency of division operations with respect to amounts of time consumed, semiconductor area utilized and/or resources consumed, for example, circuitry to perform multi-cycle division operations may include circuitry to perform individual radix-n iterations including, for example, speculation and/or replication of remainder updates and/or calculation of an estimated remainder for a second iteration of a particular cycle during a first iteration of the particular cycle, as explained more fully below. Further, as explained more fully below, circuitry to perform multi-cycle division operations may include circuitry to pre-calculate an estimated remainder for a first iteration of a particular cycle during a previous cycle, in an implementation. Additionally, in an implementation, circuitry to perform multi-cycle division operations may implement a remainder sign parameter to reduce complexity of speculative calculations of remainder values and/or remainder estimates, as explained more fully below.

FIG. 1 is an illustration of an embodiment 100 of an example mobile device. In an implementation, mobile device 100 may include one or more processors, such as processor 200, and/or may include one or more communications interfaces, such as communications interface 120. In an implementation, communications interface 120 may enable wireless communications between mobile device 100 and one or more other computing devices. In an implementation, wireless communications may occur substantially in accordance any of a wide range of communication protocols, such as those mentioned herein, for example.

In an implementation, mobile device 100 may include a memory, such as memory 130. In an implementation, memory 130 may comprise a non-volatile memory, for example. Further, in an implementation memory 130 may have stored therein executable instructions, such as for one or more operating systems, communications protocols, and/or applications, for example. Further, in an implementation, mobile device 100 may include a display, such as display 140, one or more sensors, such as one or more sensors 150, one or more cameras, such as one or more cameras 160, and/or one or more microphones, such as microphone 170, for example. In an implementation, sensors 150 may include one or more accelerometers, gyroscopes, thermometers, magnetometers, barometers, light sensors, or proximity sensors, or a combination thereof. Of course, these are merely example types and/or configurations of components that may be included in a mobile device, and claimed subject matter is not limited in scope to these particular examples.

Figure 2:
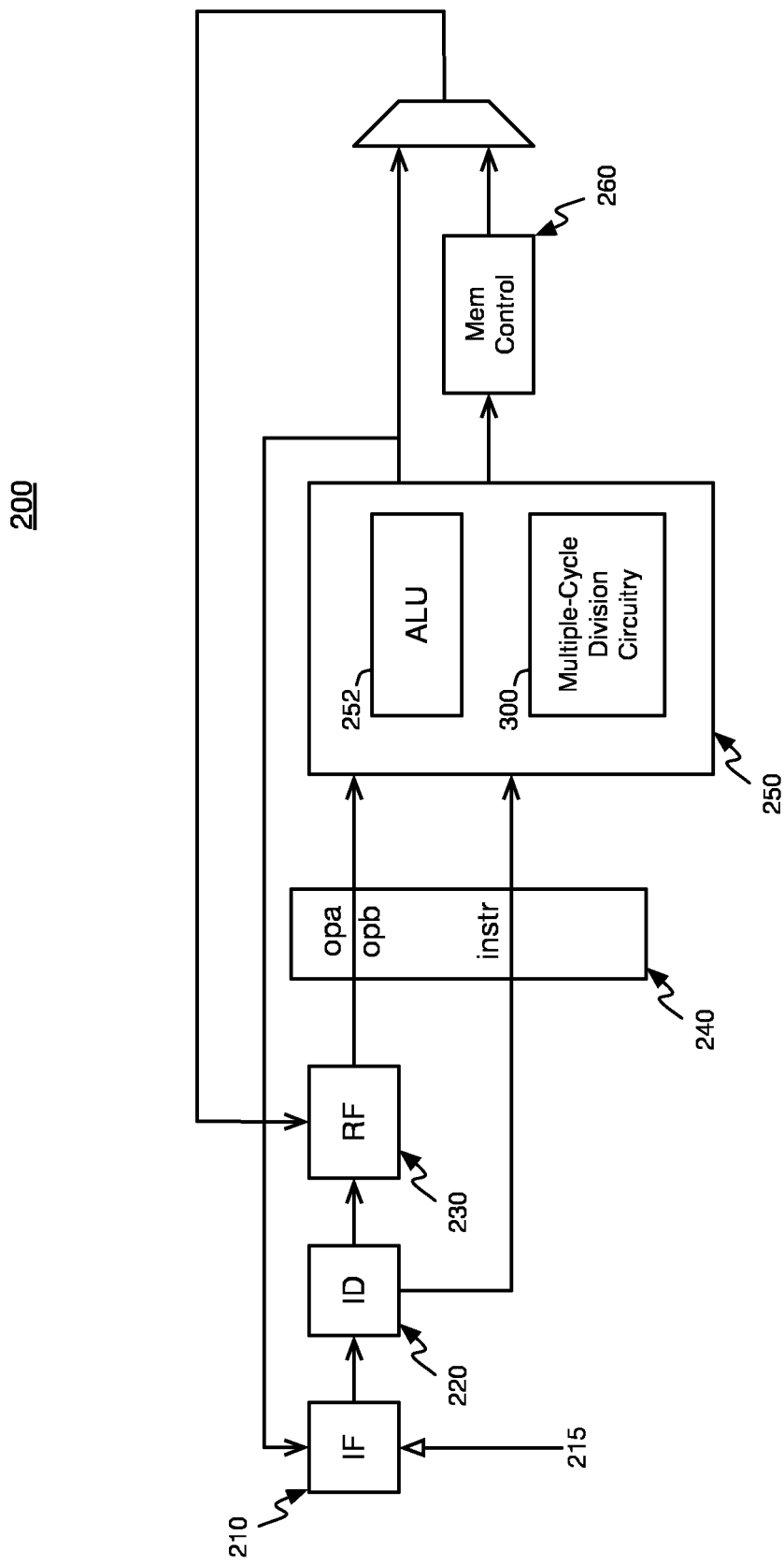
FIG. 2 is a schematic diagram depicting an example processor, in accordance with an embodiment.

As mentioned above, to improve efficiency of division operations with respect to amounts of time consumed, semiconductor area utilized and/or resources consumed, for example, processor 200 may include circuitry to perform multi-cycle division operations, as discussed above and as explained more fully below. FIG. 2 is a schematic block diagram depicting an embodiment 200 of an example processor. In an implementation, processor 200 may include an instruction fetch unit (IF), such as instruction fetch unit 210, and/or an instruction decode unit (ID), such as instruction decode unit 220. In an embodiment, an instruction fetch unit, such as IF 210, may obtain executable instructions, such as executable instructions 215, from a memory, such as memory 130. Also, in an implementation, an instruction decode unit, such as ID 220, may obtain executable instructions from IF 210 and/or may decode the executable instructions. In an implementation, decoded executable instructions may be communicated between ID 220 and a register file, such as RF 230, and/or a pipeline register, such as pipeline register 240. In an implementation, RF 230 may comprise a 16 entry 32-bit register file, for example. Also, in an implementation, processor 200 may implement a 32 bit data path. In an implementation, an instruction execution unit, such as instruction execution unit 250, may obtain a decoded executable instruction and/or one or more operands from pipeline register 240. However, claimed subject matter is not limited in scope in these respects. In an implementation, processor 200 may further include a memory controller unit, such as memory controller unit 260, by which parameters may be communicated between processor 200 and memory 130, for example. In an implementation, signals and/or states representative of result values from instruction execution unit 250 may be stored memory 130 and/or may be communicated to RF 230.

Figure 3:
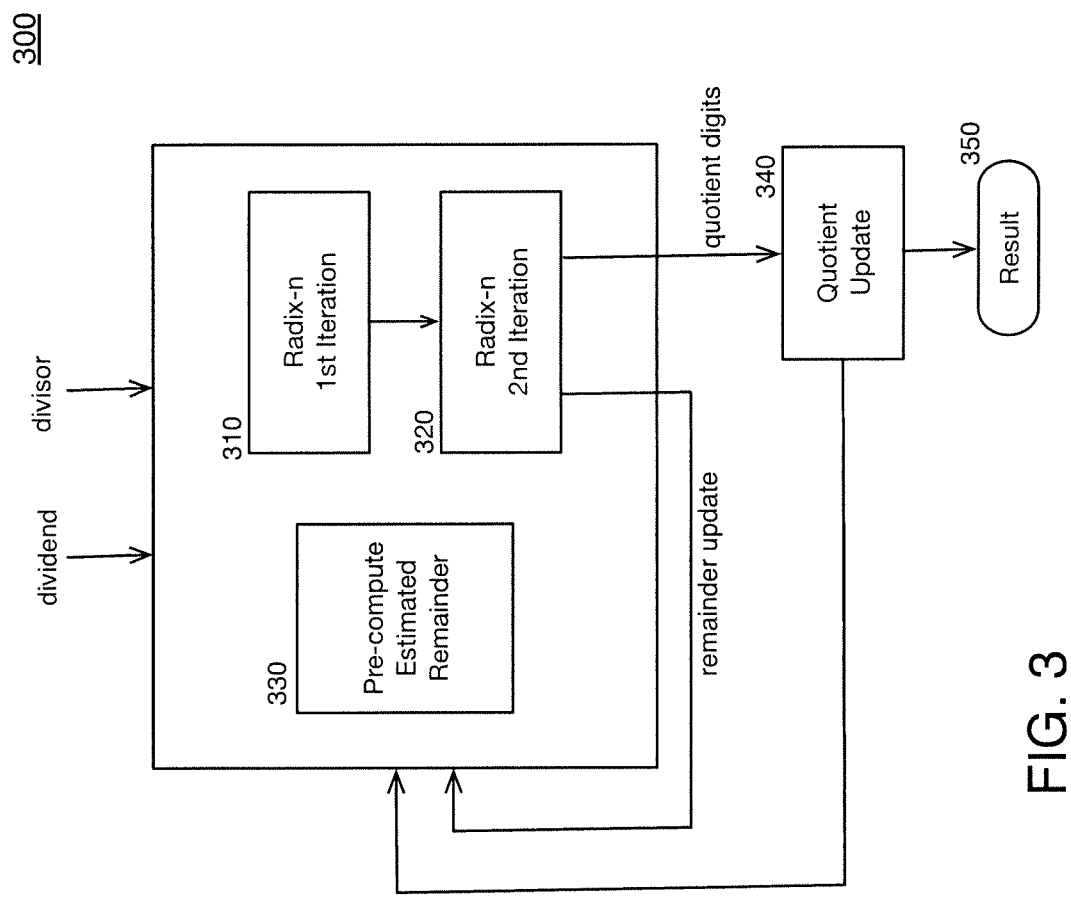
FIG. 3 is a schematic diagram depicting example multi-cycle division circuitry, in accordance with an embodiment.

In an implementation, instruction execution unit 250 may include a general purpose arithmetic logic unit (ALU), such as ALU 252. Also, in an implementation, instruction execution unit 250 may include multi-cycle division circuitry, such as multi-cycle division circuitry 300 depicted, for example, in FIG. 3. In an implementation, multi-cycle division circuitry 300 may be directed to performing digit-recurrence-type division operations. For example, as explained more fully below, multi-cycle division circuitry 300 may generate one or more signals and/or states representative of a result value 350 (e.g., quotient result value) based at least in part on a dividend value and/or divisor value, wherein performing an individual cycle of the multiple-cycles of the radix-m division operation may include performing a first radix-n iteration 310 and a second radix-n iteration 320 to generate first and second radix-n quotient values (e.g., quotient digits), wherein n is a square root of m. Further, as discussed more fully below, multi-cycle division circuitry 300 may implement an iterative divisional approach wherein for individual iterations a radix-n quotient value (e.g., may be computed as well as a remainder value (e.g., rem[i+1]). In an implementation, multi-cycle division circuitry 300 may include circuitry 330 to pre-calculate an estimated remainder for a first iteration of a particular cycle during a previous cycle. Multi-cycle division circuitry 300 may further include circuitry 340 to update a quotient value, as explained more fully below.

In an implementation, multi-cycle division circuitry 300 may perform radix-64 division operations that may include two radix-8 iterations per cycle. In an implementation, a radix-64 division operation may generate a six bit quotient value per iteration, and a radix-8 division operation may generate a three bit quotient value per iteration. Therefore, in an implementation, two radix-8 iterations may be utilized to perform a radix-64 iteration to generate a six bit quotient value per cycle. Although examples disclosed herein describe radix-64 division including multiple cycles including two radix-8 iterations per cycle, claimed subject matter is not limited in scope in these respects.

As indicated, for example, remainder rem[i] may be utilized to calculate radix-n quotient value $q_{[i+1]}$. In an implementation, a remainder value may be maintained in a redundant representation, as explained more fully below. For example, in an implementation, a remainder may be represented at least in part by two parameters, one with a positive value and another with a negative value. A non-redundant remainder may be determined at least in part by subtracting the negative value from the positive value, for example. As utilized herein, and as explained more fully below, subtracting a negative remainder parameter value from a positive remainder parameter value to determine a non-redundant remainder value may be referred to as remainder "assimilation" and/or the like.

In an implementation, to perform radix-8 digit recurrence division operations, a partial quotient Q[i] prior to a particular $i^{th}$ iteration may be specified in accordance with example relation (1), provided below.

$$Q[i] = \sum_{j=1}^{i} q_j \times 8^{-j} \quad (1)$$

In an implementation, a particular radix-8 iteration may be specified in accordance with example relations (2) and (3), below.

$$q_{i+1} = \text{SEL}(8 \times \widetilde{rem}[i]) \quad (2)$$

$$\text{rem}[i+1] = 8 \times \text{rem}[i] - d \times q_{i+1} \quad (3)$$

wherein $q_{[i+1]}$ represents a quotient value for a particular iteration (e.g., second iteration), wherein d represents a divisor value and/or wherein $\widetilde{rem}[i]$ represents a selected number of bits of an estimate of remainder rem[i] for a previous iteration (e.g., first iteration). Further, in an implementation, an initial remainder (e.g., prior to first iteration of a two-iteration cycle) may be specified according to example relation (4), wherein x represents a dividend value.

$$\text{rem}[0] = x/8 \quad (4)$$

Further, in an implementation, a radix-8 quotient value (e.g., quotient-digit) for individual iterations may be calculated by multi-cycle division circuitry 300, for example, based at least in part on a current remainder and a new remainder value may be computed for a next iteration in accordance with example relations (2) and (3), discussed above.

In an implementation, a selection function may include a comparison of a remainder estimate with a set of eight divisor-dependent selection constants comprising one constant per digit value. For example, a quotient value for a particular iteration may be calculated at least in part in accordance with example relation (5):

$$q_{i+1} = k \Leftrightarrow cte(k) \leq \widetilde{rem}[i] < cte(k+1) \quad (5)$$

wherein cte(k) and/or cte(k+1) represent selection constants for digit values k and k+1, respectively, wherein $k \in \{-3, -2, -1, 0, +1, +2, +3, +4\}$, and wherein if a remainder estimate is lower than cte(-3) the quotient value is -4. As discussed more fully below, in an implementation, ten most significant bits of a remainder may be assimilated per iteration to yield a remainder estimate suitably and/or sufficiently accurate for digit selection.

As mentioned, a selection function may be based at least in part on a divisor value. In an implementation, six most-significant bits of a divisor may be utilized to determine a set of eight selection constants for the various iterations of a particular multi-cycle division operation. For example, different divisor values may result in different sets of selection constants. In an implementation, a most-significant bit of a divisor may comprise a value of "1" due at least in part to operands being normalized prior to constant selection. Further, in an implementation, selection constants may be stored in a 32×80-bit look-up table (LUT). In an implementation, a LUT may be maintained, for example, in memory 130.

Figure 4:
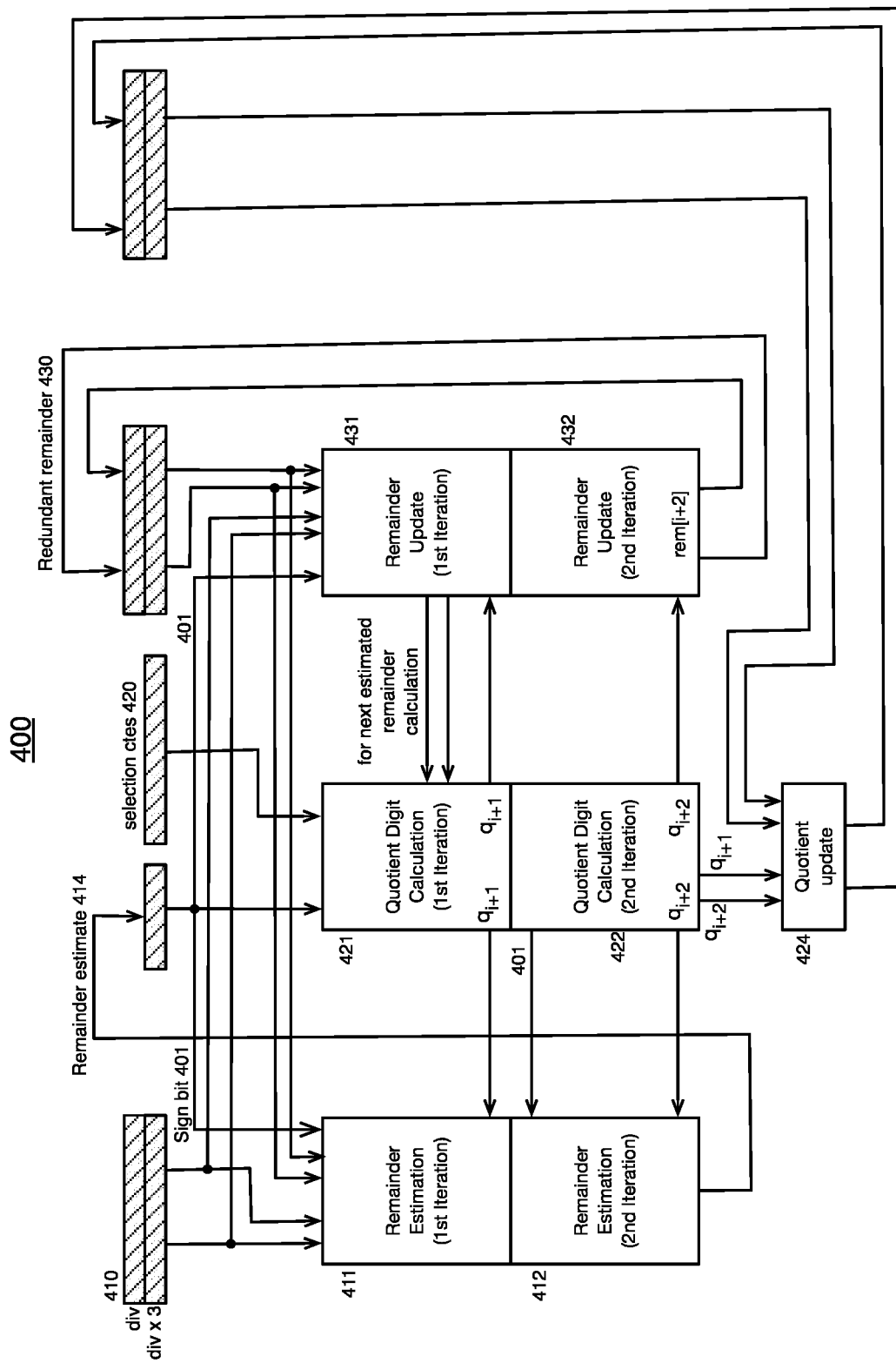
FIG. 4 is a schematic diagram depicting example multi-cycle division circuitry, in accordance with an embodiment.

FIG. 4 is a schematic diagram depicting an embodiment 400 of example multi-cycle division circuitry. As mentioned, to improve efficiency of division operations with respect to amounts of time consumed, semiconductor area utilized and/or resources consumed, for example, multi-cycle division circuitry 400 may include circuitry to perform two individual radix-8 iterations per cycle. As depicted in FIG. 4, for example, circuitry 400 may be adapted to perform, for example, speculation and/or replication of remainder updates and/or calculation of an estimated remainder for a second iteration of a particular cycle during a first iteration of the particular cycle. Further, circuitry 400 may include, circuitry 411 and/or 412 to pre-calculate estimated remainder values for particular iterations of a particular cycle during a previous cycle, in an implementation. Additionally, in an implementation, circuitry 400 may implement a reminder sign parameter 401 to reduce complexity of speculative calculations of remainder values and/or remainder estimates.

In general, example multi-cycle division circuitry 400 may be partitioned into several functions, including, for example, 1) remainder update circuits 431 and/or 432, 2) quotient digit calculation circuits 421 and/or 422 and quotient update circuit 424, and/or 3) remainder estimation circuits 411 and/or 412. In an implementation, remainder estimation circuits 411 and/or 421 may include assimilating ten most-significant bits of a remainder. For example, circuits 411 and/or 412 may obtain remainder values from one or more remainder value buffers 430. Further, in an implementation, estimated remainder values may be utilized by quotient digit calculation circuits 421 and/or 431 for quotient digit selection. In an implementation, an estimated remainder value for a first iteration of a current cycle may be calculated by remainder estimation circuits 411 and/or 412 during a previous cycle and stored in an estimated remainder value buffer 414.

Figure 5:
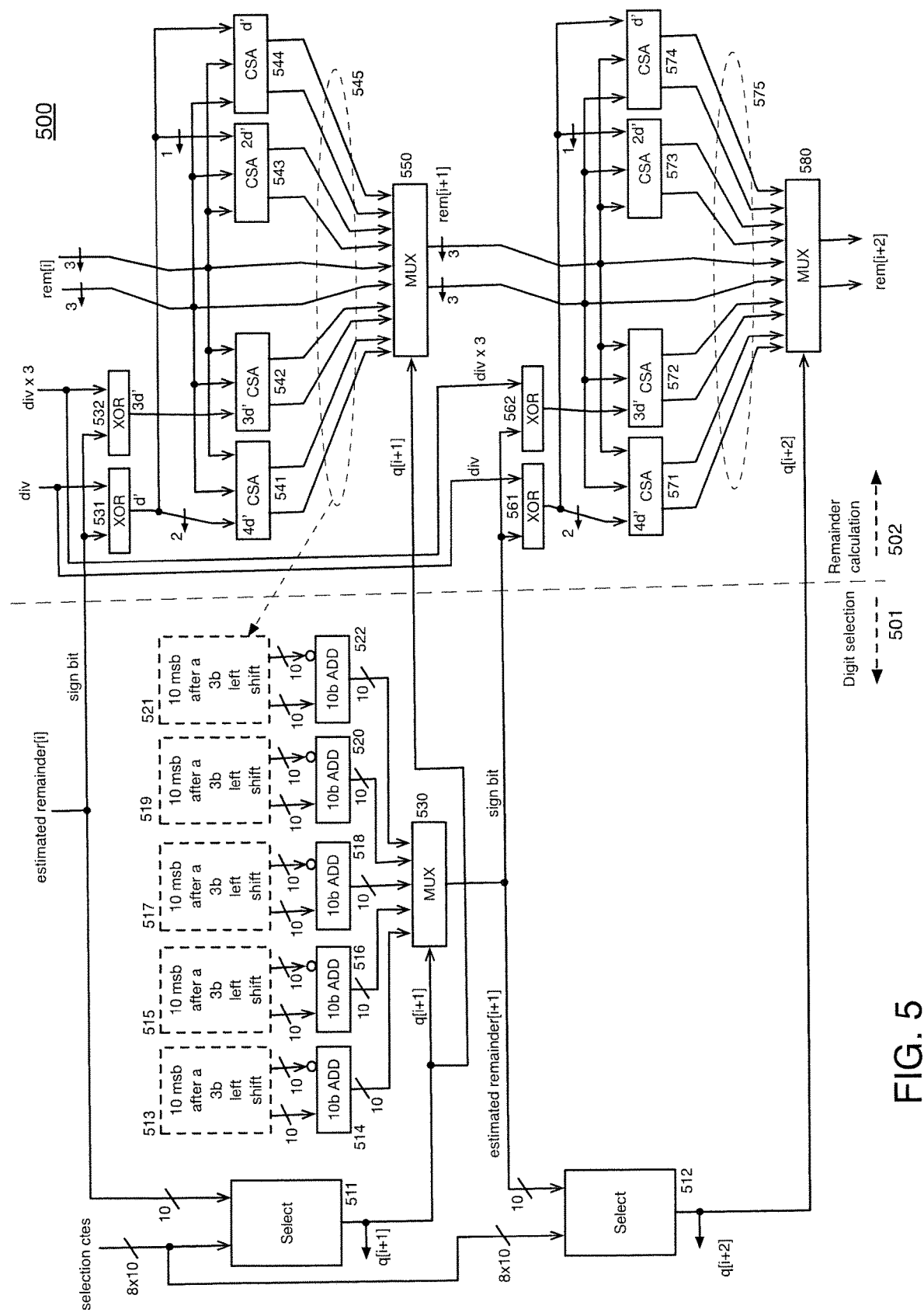
FIG. 5 is a schematic diagram depicting example multi-cycle division circuitry including example quotient digit selection circuitry and/or example remainder calculation circuitry, in accordance with an embodiment.

FIG. 5 is a schematic diagram depicting an embodiment 500 of example multi-cycle division circuitry including example quotient digit selection circuitry 501 and/or example remainder calculation circuitry 502. In an implementation, quotient digit selection circuitry 501 may correspond in at least some respects to quotient digit calculation circuits 421 and/or 422 of example circuitry 400. Further, in an implementation, remainder calculation circuitry 502 may correspond at least in some respects to remainder update circuits 431 and/or 432 of example circuitry 400.

In an implementation, remainder calculation circuitry 502 may speculatively compute a remainder for individual iterations of individual cycles of a multi-cycle division operation. For example, particular remainders for every possible value of a quotient digit may be calculated. In an implementation, responsive at least in part to determination of a quotient value for a particular iteration, an appropriate and/or suitable remainder value may be selected from the speculatively calculated set of remainders. For example, a multiplexer 550 may select a particular remainder value from among a set of speculatively-calculated remainder values 545 based at least in part on a quotient value q[i+1] generated by selection circuitry 511. Similarly, for example, a multiplexer 580 may select a particular remainder value from among a set of speculatively-calculated remainder values 575 based at least in part on a quotient value q[i+2] generated by selection circuitry 512.

In an implementation, a sign bit for an estimated remainder value may be utilized to reduce a number of speculative remainder values to be calculated. For the present example, if an estimated remainder is a positive value than a quotient value may comprise a value within a set {+4, +3, +2, +1, 0}. Similarly, for the present example, if an estimated remainder is a negative value than a quotient value may comprise a value within a set {−4, −3, −2, −1, 0}. As indicated in FIG. 5, a divisor value and a divisor value multiplied by three (see also divisor values 410 depicted in FIG. 4) may be XORed at circuits 531 and 532 and/or circuits 561 and 562 with a sign bit for an estimated remainder value. Further, a sign bit for an estimated remainder value may be placed in a least-significant bit of a speculative remainder redundant representation carry word, in an implementation. As a result, for the present example, five speculative remainder values may be computed rather than the nine values that might otherwise be needed without implementation of the estimated remainder sign bit. For example, for a $1^{st}$ iteration, speculative remainder values may be calculated at least in part by circuits 541, 542, 543 and/or 544. Further, for a $2^{nd}$ iteration, speculative remainder values may be calculated at least in part by circuits 571, 572, 573 and/or 574, for example. It may be noted that divisor and divisor×3 values may be utilized for both iterations in the present example. However, for the respective iterations, the divisor and divisor×3 values are XORed with different sign bit values, as indicated in FIG. 5, for example.

In an implementation, quotient values (e.g., q[i+1] and/or q[i+2]) may be calculated based at least in part on stored selection constants (see also selection constants 420 depicted in FIG. 4) and/or on estimated remainder values. For example, quotient value q[i+1] may calculated at least in part by selection circuitry 511 and/or quotient value q[i+2] may calculated at least in part by selection circuitry 512. As mentioned, a selection function, such as may be implemented by circuits 511 and/or 512, for example, may include a comparison of an estimated remainder value (e.g., rem estimation[i]) a set of eight divisor-dependent selection constants. As was indicated, a quotient value for a particular iteration may be calculated at least in part in accordance with example relation (5), provided above. Further, in an implementation, ten most-significant bits of an estimated remainder may be utilized in quotient value calculations, as indicated in FIG. 5. In an implementation, an estimated remainder value for a first iteration (e.g., estimated reminder remainder[i]) may be pre-calculated during a previous cycle and/or may be stored in one or more buffers and/or registers, for example.

Additionally, in an implementation, an estimated remainder value for a second iteration (e.g., estimated remainder [i+1]) of a particular cycle may be speculatively computed during a first iteration of the particular cycle. For example, as indicated in FIG. 5, ten most significant bits of speculative remainder values 545 may be assimilated as indicated at blocks 513, 515, 517, 519 and/or 521 and/or at circuits 514, 516, 518, 520 and/or 522. In an implementation, selection by multiplexor circuit 530 of an appropriate and/or suitable estimated remainder value for the second iteration may be based at least in part on a quotient value q[i+1], as indicated.

In an implementation, quotient value selection (e.g., quotient values q[i+1] and/or q[i+2]) may be implemented at circuits 511 and/or 512 at least in part by way of eight 10-bit comparator circuits. For example, an estimated remainder value (e.g., estimated remainder[i] and/or estimated remainder[i+1]) may be compared concurrently with selection constants for digits in a set [−3, +4]. In an implementation, quotient value digits may be stored and/or otherwise represented as a 1-hot 9-bit vector, with particular bits of the vector representing particular quotient value digits. For example, a digital value of +3 may be represented as 010000000 and/or a digit value of −2 may be stored as 000000100. In an implementation, logic circuitry may determine a particular 1-hot 9-bit vector based at least in part on the comparator circuits' outputs.

In an implementation, utilization of a pre-calculated estimated remainder values for first iterations of individual cycles and/or speculative calculation of remainder estimates for second iterations, for example, may allow for simplified and/or reduced amounts of circuitry to implement multi-cycle division operations, resulting therefore in improved efficiency with respect to amounts of time consumed for division operations. Improved efficiency may also be realized with respect to semiconductor area utilization and/or processing and/or memory resource consumption, for example.

Figure 6:
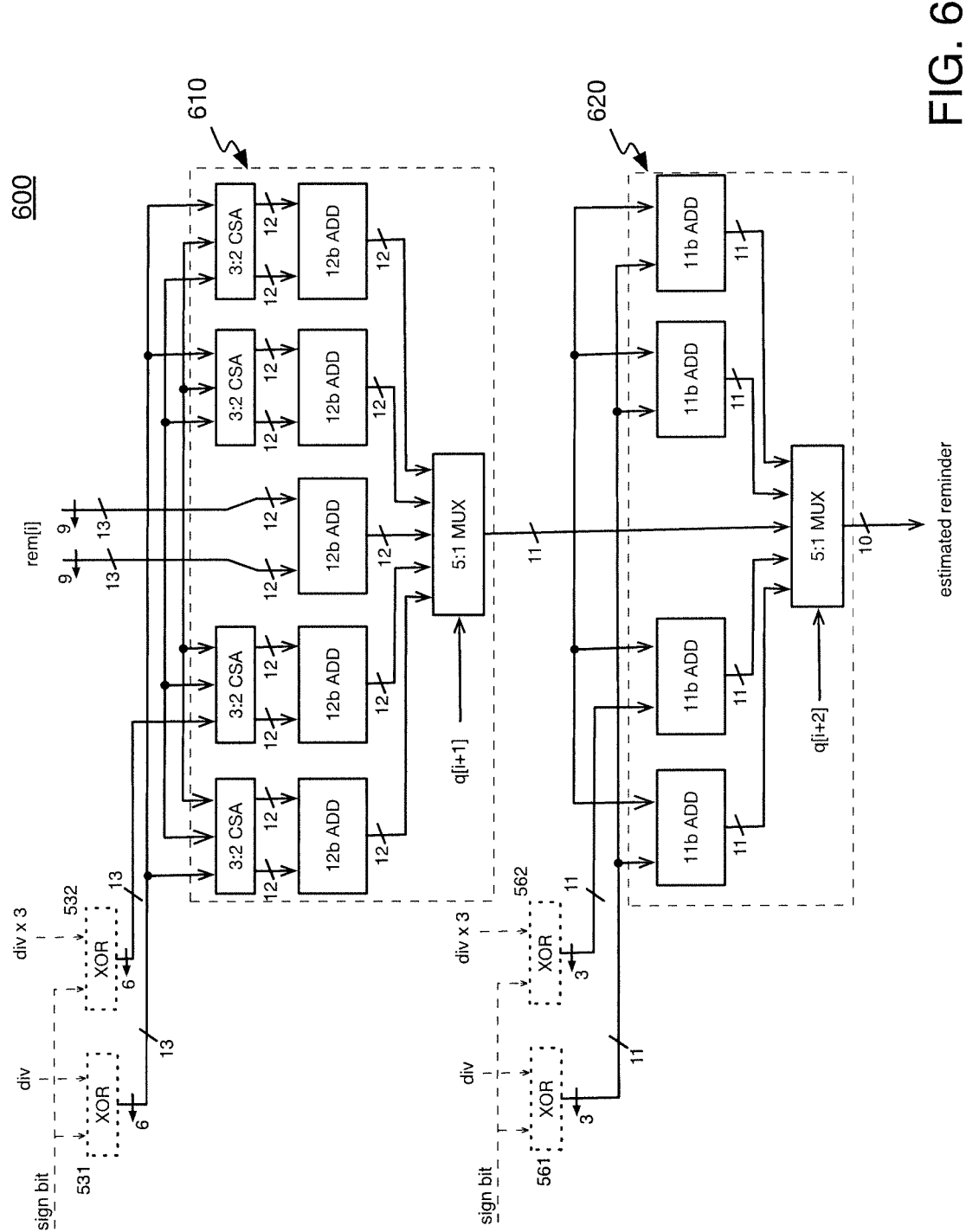
FIG. 6 is a schematic block diagram depicting example remainder estimation circuitry, in accordance with an embodiment.

FIG. 6 is a schematic block diagram depicting an embodiment 600 of example remainder estimation circuitry. In an implementation, remainder estimation circuitry 600 may correspond in at least some respects to remainder estimation circuits 411 and/or 412 of example circuitry 400. As mentioned, estimated remainder values for first iterations of individual cycles may be pre-calculated during a previous cycle. Because remainder estimation operations for a first iteration have already been performed, the amount of time to perform operations of a first iteration may be reduced, for example. In an implementation, pre-calculated estimated remainder values may be stored in one or more flip-flops, buffers, registers, etc.

In an implementation, based at least in part on example relation (3) provided above, an estimated remainder value for a next cycle (e.g., rem[i+2]) may be determined at least in part in accordance with example relation (6), below.

$$\text{rem}[i+2] = 8 \times \text{rem}[i+1] - q_{i+2} \times d \quad (6)$$

Example relation (7), below, may be derived at least in part by replacing rem[i+2] with its value in terms of rem[i] and including a three-bit left shift.

$$8\text{rem}[i+2] = 8 \times (64 \times \text{rem}[i] - (8 \times q_{i+2}) \times d) \quad (7)$$

As mentioned, in an implementation, the ten most-significant bits may be utilized. Therefore, in an implementation, calculations may be restricted to the ten most significant bits.

In an implementation, example relation (7) may be calculated, such as via circuitry 600, in two parts. For example, an example relation (8), below, may be evaluated by circuitry 610 during a first iteration of a particular cycle and example relation (9), below, may be evaluated by circuitry 620 during a second iteration of the particular cycle.

$$\lfloor \widetilde{\times r} \text{em}[i+1] \rfloor_{11} = \lfloor 8 \times (64 \times \text{rem}[i] - 8 \times q_{i+1} \times d) \rfloor_{13} \quad (8)$$

$$\lfloor \widetilde{\times re} m[i+2] \rfloor_{10} = \lfloor 64 \widetilde{\times r} \text{em}[i+1] \rfloor_{11} - \lfloor 8 \times q_{i+2} \times d \rfloor_{11} \quad (9)$$

wherein $\lfloor \cdot \rfloor$, indicates that x-most significant bits are involved in a computation. Therefore, for example, $\lfloor 64 \widetilde{\times r} \text{em}[i+1] \rfloor_{11}$ may represent an estimate of 64×rem[i+1] with 11 bits. Also, for example, to have a bounded error in an estimate, the number of bits for input values may be larger than a number of bits for a result value. Further, for example, $\lfloor 8 \widetilde{\times re} m[i+2] \rfloor_{10}$ may represent an estimate of 8×rem[i+2] with 10 bits.

In an implementation, circuitry 610, for example, may perform an operation in accordance with example relation (8) during a first iteration of a particular cycle of a multi-cycle division operation. As depicted in FIG. 6, an appropriate and/or suitable output for circuitry 610 may be selected based at least in part on quotient value $q_{i+1}$, for example. Also, in an implementation, circuitry 620 may perform an operation based at least in part on example relation (9) during a second iteration of the particular cycle of the multi-cycle division operation. As indicated in FIG. 6, selection of an estimated remainder value for a subsequent cycle of a multi-cycle division operation may be based at least in part on quotient value $q_{i+2}$, for example.

In an implementation, XOR circuits 531 and 532 and/or XOR circuits 561 and 562 depicted in FIG. 6 may correspond to XOR circuits 531 and 532 and/or XOR circuits 561 and 562 depicted in FIG. 5. Further, in an implementation, during a first iteration of a particular cycle, a remainder value may be left-shifted by nine bits and a divisor value, as well as a divisor×3 value, may be left-shifted by six bits by circuitry 610 to implement the "8×64×rem[i]" and "8×8×d" products expressed in example relation (8). Also, in an implementation, during a second iteration of a particular cycle, a divisor value, as well as a divisor×3 value, may be left-shifted by three bits by circuitry 620 to implement an "8×d" product expressed in example relation (9). Additionally, in an implementation, as indicated in FIG. 6, thirteen bits may initially be utilized by the 3-to-2 CSA circuits of circuitry 610. The number of bits may be reduced to twelve in the adder circuits of circuitry 610 and then to eleven in the multiplexor of circuitry 610, for example. In an implementation, the least-significant bits may be discarded to accomplish the noted reductions in the numbers of bits. Additionally, for circuitry 620, another bit may be discarded following the adder circuits to yield ten bit values. Of course, as mentioned, claimed subject matter is not limited in scope to the specific examples described herein.

Figure 7:
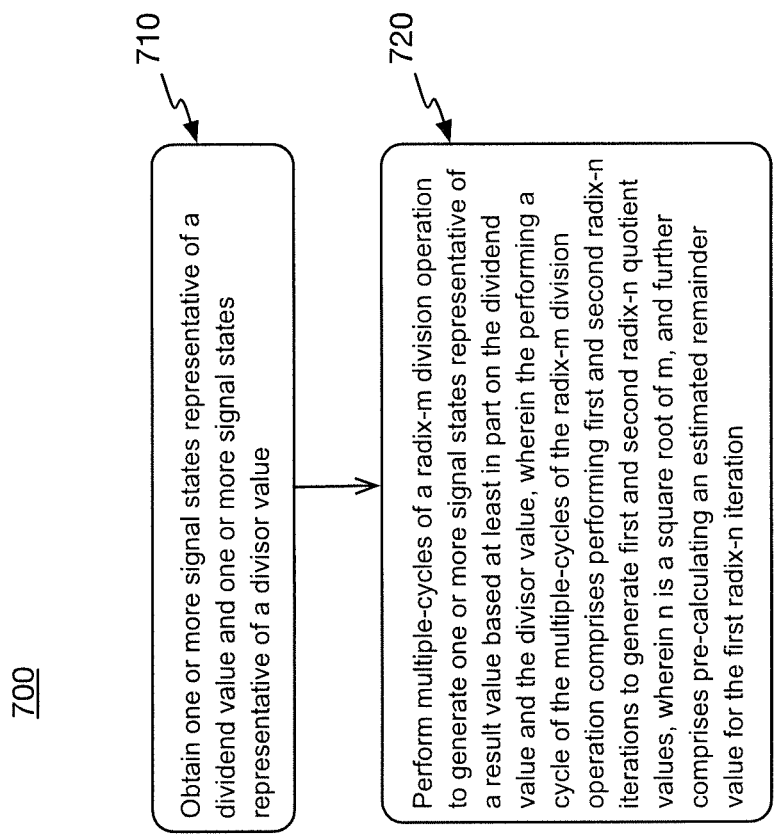
FIG. 7 is a flow diagram depicting of an example process for multi-cycle division, in accordance with an embodiment.

FIG. 7 is a flow diagram depicting of an embodiment 700 of an example process for multi-cycle division. It should be noted that content acquired or produced, such as, for example, input signals, output signals, operations, results, etc. associated with example process 700 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

In an implementation, example process 700 may include obtaining one or more signals and/or states representative of a dividend value and one or more signals and/or states representative of a divisor value, as indicated at block 710. For example, processor 200 may obtain one or more signals and/or states representative of a dividend value and one or more signals and/or states representative of a divisor value from one or more executable instructions stored, for example, in memory 130. Further, in an implementation, example process 700 may include performing multiple-cycles of a radix-m division operation, such as via multiple-cycle division circuitry 300 and/or 400, for example, to generate one or more signal states representative of a result value based at least in part on a dividend value and a divisor value, wherein performing a cycle of the multiple-cycles of the radix-m division operation comprises performing first and second radix-n iterations to generate first and second radix-n quotient values, wherein n is a square root of m, and further comprises pre-calculating an estimated remainder for a first radix-n iteration, as indicated at block 720. In an implementation, performing first and second radix-n iterations may individually comprise speculatively calculating a plurality of remainder candidates and/or subsequently selecting a particular remainder candidate from among a plurality of remainder candidates to generate a remainder value for a respective radix-n iteration responsive at least in part to a calculation of a respective radix-n quotient value. Additionally, for example, speculatively calculating a plurality of remainder candidates may comprise generating individual remainder candidates for respective individual quotient values of a set of possible quotient values. In an implementation, a pre-calculated remainder may include a sign bit to reduce a number of speculatively calculated remainder candidates, as previously mentioned.

Further, in an implementation, subsequently selecting a particular remainder candidate may be based at least in part on a respective calculated radix-n quotient value. Also, for example, performing a first radix-n iteration to generate a first radix-n quotient value may include calculating a first radix-n quotient value based at least in part on an estimated remainder for a first radix-n iteration pre-calculated during a previous cycle. In an implementation, calculating a first radix-n quotient value may further be based at least in part on a plurality of selection constant values derived at least in part from the divisor value.

In an implementation, example process 700 may also include calculating an estimated remainder value for a second radix-n iteration during a first radix-n iteration. For example, calculating an estimated remainder value for a second radix-n iteration during a first radix-n iteration may be based at least in part on a plurality of remainder candidates speculatively-calculated during a first radix-n iteration and/or may be based at least in part on a first radix-n quotient value.

Further, in an implementation, performing a second radix-n iteration to generate a second radix-n quotient value may include calculating a second radix-n quotient value based at least in part on an estimated remainder value for a second radix-n iteration determined during a first radix-n iteration. Additionally, for example, calculating a second radix-n quotient value may further be based at least in part on a plurality of selection constant values derived at least in part from a divisor value.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later. It should be noted that features of FIGS. 2 through 6 may be implemented in circuitry using any one of several current and future process technologies such as, for example, process technology for forming complementary metal oxide semiconductor (CMOS) devices. It should be further noted that the various circuit implementations of features disclosed herein may be described using computer aided design tools and expressed (or represented), as expressions and/or instructions embodied in various computer and/or machine-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

If received within a computer system via one or more machine-readable media, such electronic representation and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 8:
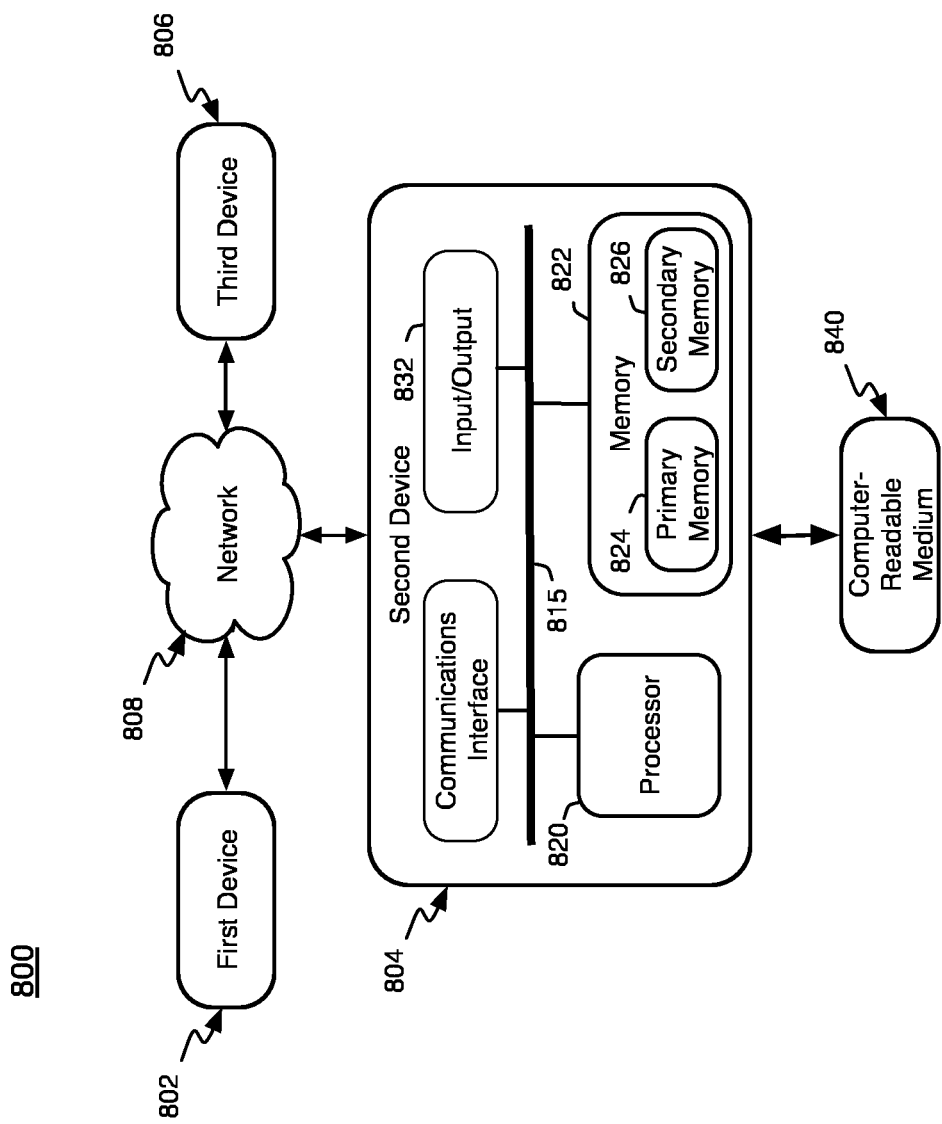
FIG. 8 is a schematic diagram of an example computing device, in accordance with an embodiment.

In one example embodiment, as shown in FIG. 8, a system embodiment may comprise a local network (e.g., device 804 and medium 840) and/or another type of network, such as a computing and/or communications network. For purposes of illustration, therefore, FIG. 8 shows an embodiment 800 of a system that may be employed to implement either type or both types of networks. Network 808 may comprise one or more network connections, links, processes, services, applications, and/or resources to facilitate and/or support communications, such as an exchange of communication signals, for example, between a computing device, such as 802, and another computing device, such as 806, which may, for example, comprise one or more client computing devices and/or one or more server computing device. By way of example, but not limitation, network 808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 8 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 3-7 and in the text associated at least with the foregoing figure(s) of the present patent application.

Referring now to FIG. 8, in an embodiment, first and third devices 802 and 806 may be capable of rendering a graphical user interface (GUI) for a network device and/or a computing device, for example, so that a user-operator may engage in system use. Device 804 may potentially serve a similar function in this illustration. Likewise, in FIG. 8, computing device 802 ('first device' in figure) may interface with computing device 804 ('second device' in figure), which may, for example, also comprise features of a client computing device and/or a server computing device, in an embodiment. Processor (e.g., processing device) 820 and memory 822, which may comprise primary memory 824 and secondary memory 826, may communicate by way of a communication bus 815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, sensor content, etc. in the form of signals and/or states. Thus, a computing device, in the context of the present patent application, may comprise hardware, software, firmware, or any combination thereof (other than software per se). Computing device 804, as depicted in FIG. 8, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, endpoint and/or sensor nodes, gateway devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, sensor content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 8, computing device 802 may provide one or more sources of executable computer instructions in the form physical states and/or signals (e.g., stored in memory states), for example. Computing device 802 may communicate with computing device 804 by way of a network connection, such as via network 808, for example. As previously mentioned, a connection, while physical, may not necessarily be tangible. Although computing device 804 of FIG. 8 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 822 may comprise any non-transitory storage mechanism. Memory 822 may comprise, for example, primary memory 824 and secondary memory 826, additional memory circuits, mechanisms, or combinations thereof may be used. Memory 822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 822 may be utilized to store a program of executable computer instructions. For example, processor 820 may fetch executable instructions from memory and proceed to execute the fetched instructions. Memory 822 may also comprise a memory controller for accessing device readable-medium 840 that may carry and/or make accessible digital content, which may include code, and/or instructions, for example, executable by processor 820 and/or some other device, such as a controller, as one example, capable of executing computer instructions, for example. Under direction of processor 820, a non-transitory memory, such as memory cells storing physical states (e.g., memory states), comprising, for example, a program of executable computer instructions, may be executed by processor 820 and able to generate signals to be communicated via a network, for example, as previously described. Generated signals may also be stored in memory, also previously suggested.

Memory 822 may store electronic files and/or electronic documents, such as relating to one or more users, and may also comprise a computer-readable medium that may carry and/or make accessible content, including code and/or instructions, for example, executable by processor 820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 8, processor 820 may comprise one or more circuits, such as digital circuits, to perform at least a portion of a computing procedure and/or process. By way of example, but not limitation, processor 820 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 820 may perform signal processing, typically substantially in accordance with fetched executable computer instructions, such as to manipulate signals and/or states, to construct signals and/or states, etc., with signals and/or states generated in such a manner to be communicated and/or stored in memory, for example. In an implementation, processor 820, for example, may perform multi-cycle division operations such as discussed above. In an implementation, processor 820 may include multi-cycle division circuitry, such as, for example, circuitry 300, 400, 500 and/or 600 discussed above. Further, in an implementation, processor 820 may execute one or more executable instructions to perform multi-cycle division operations, such as example operations described herein.

FIG. 8 also illustrates device 804 as including a component 832 operable with input/output devices, for example, so that signals and/or states may be appropriately communicated between devices, such as device 804 and an input device and/or device 804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:
   obtaining one or more signals and/or states representative of a dividend value and one or more signals and/or states representative of a divisor value; and
   performing multiple cycles of a radix-m division operation to generate one or more signal states representative of a result value based at least in part on the dividend value and the divisor value, wherein:
   performing a particular cycle of the multiple cycles of the radix-m division operation comprises performing first and second radix-n iterations utilizing, at least in part, a multi-stage quotient digit calculation circuit to generate first and second radix-n quotient values;
   n is a square root of m; and
   the first and second radix-n iterations individually comprise speculative calculations of a plurality of remainder candidates utilizing at least in part a plurality of adder circuits of a multi-stage remainder calculation circuit based at least in part on the divisor value XORed with a sign bit of a previously calculated remainder estimate and subsequent selection of a particular remainder candidate from among the plurality of remainder candidates.

2. The method of claim 1, wherein the speculative calculations of the plurality of remainder candidates and subsequent selection of the particular remainder candidate from among the plurality of remainder candidates includes generation of a remainder value for the respective radix-n iteration responsive at least in part to a calculation of a respective radix-n quotient value.

3. The method of claim 2, wherein the speculative calculations of the plurality of remainder candidates comprises generation of individual remainder candidates for respective individual quotient values of a set of possible quotient values.

4. The method of claim 2, further comprising pre-calculating, at least in part at a multi-stage remainder estimation circuit, an estimated remainder value for the first radix-n iteration of the particular cycle during a previous cycle.

5. The method of claim 4, wherein the subsequent selection of the particular remainder candidate is based at least in part on the calculated respective radix-n quotient value.

6. The method of claim 5, wherein the performing the first radix-n iteration to generate the first radix-n quotient value comprises calculating the first radix-n quotient value based at least in part on an estimated remainder value for the first radix-n iteration pre-calculated during the previous cycle.

7. The method of claim 6, wherein the calculating the first radix-n quotient value is further based at least in part on a plurality of selection constant values derived at least in part from the divisor value.

8. The method of claim 2, further comprising calculating an estimated remainder value for the second radix-n iteration during the first radix-n iteration.

9. The method of claim 8, wherein the calculating the estimated remainder value for the second radix-n iteration during the first radix-n iteration is based at least in part on a plurality of remainder candidates speculatively calculated during the first radix-n iteration and based at least in part on the first radix-n quotient value.

10. The method of claim 8, wherein the performing the second radix-n iteration to generate the second radix-n quotient value comprises calculating the second radix-n quotient value based at least in part on the estimated remainder value for the second radix-n iteration determined during the first radix-n iteration.

11. The method of claim 10, wherein the calculating the second radix-n quotient value is further based at least in part on a plurality of selection constant values derived at least in part from the divisor value.

12. An apparatus, comprising:
   a processor to obtain one or more signals and/or states representative of a dividend value and one or more signals and/or states representative of a divisor value, wherein the processor includes a multi-cycle division circuit;
   wherein the multi-cycle division circuit to perform multiple-cycles of a radix-m division operation specified at least in part by one or more executable instructions to generate one or more signal states representative of a result value based at least in part on the dividend value and the divisor value, wherein the multi-cycle division circuit, including a multi-stage quotient digit calculation circuit, to perform first and second radix-n iterations of a particular cycle of the multiple-cycles of the radix-m division operation to generate first and second radix-n quotient values, wherein n is a square root of m, and wherein the multi-cycle division circuit to perform the first and second radix-n iterations at least in part via speculative calculation of a plurality of remainder candidates at a plurality of adder circuits of a multi-stage remainder calculation circuit based at least in part on the divisor value XORed with a sign bit of a previously calculated remainder estimate and at least in part via subsequent selection of a particular remainder candidate from among the plurality of remainder candidates.

13. The apparatus of claim 12, wherein the multi-cycle division circuit to perform the first and second radix-n iterations at least in part via the speculative calculation of the plurality of remainder candidates and the subsequent selection of the particular remainder candidate from among the plurality of remainder candidates to generate a remainder value for the respective radix-n iteration responsive at least in part to a calculation of a respective radix-n quotient value.

14. The apparatus of claim 13, wherein the multi-cycle division circuit to speculatively calculate the plurality of remainder candidates at least in part via generation of individual remainder candidates for respective individual quotient values of a set of possible quotient values.

15. The apparatus of claim 13, wherein the multi-cycle division circuit to pre-calculate an estimated remainder value for the first radix-n iteration of the particular cycle during a previous cycle.

16. The apparatus of claim 15, wherein the multi-cycle division circuit to subsequently select the particular remainder candidate based at least in part on the calculated respective radix-n quotient value.

17. The apparatus of claim 16, wherein the multi-cycle division circuit to perform the first radix-n iteration to generate the first radix-n quotient value at least in part via calculation of the first radix-n quotient value based at least in part on an estimated remainder value for the first radix-n iteration pre-calculated during the previous cycle.

18. The apparatus of claim 17, wherein the multi-cycle division circuit to calculate the first radix-n quotient value based at least in part on a plurality of selection constant values derived at least in part from the divisor value.

19. The apparatus of claim 13, wherein the multi-cycle division circuit further to calculate an estimated remainder value for the second radix-n iteration during the first radix-n iteration.

20. The apparatus of claim 19, wherein the multi-cycle division circuit to calculate the estimated remainder value for the second radix-n iteration during the first radix-n iteration based at least in part on a plurality of remainder candidates speculatively calculated during the first radix-n iteration and based at least in part on the first radix-n quotient value.

* * * * *